US011989986B2

(12) United States Patent
Einberg et al.

(10) Patent No.: US 11,989,986 B2
(45) Date of Patent: May 21, 2024

(54) INSIDE OR OUTSIDE A METAL DOOR

(71) Applicant: ASSA ABLOY AB, Stockholm (SE)

(72) Inventors: Fredrik Einberg, Huddinge (SE); Mats Cederblad, Sigtuna (SE); Mattias Haeger, Solna (SE)

(73) Assignee: ASSA ABLOY AB, Stockholm (SE)

( * ) Notice: Subject to any disclaimer, the term of this patent is extended or adjusted under 35 U.S.C. 154(b) by 125 days.

(21) Appl. No.: 17/766,961

(22) PCT Filed: Oct. 7, 2020

(86) PCT No.: PCT/EP2020/078051
§ 371 (c)(1),
(2) Date: Apr. 6, 2022

(87) PCT Pub. No.: WO2021/069468
PCT Pub. Date: Apr. 15, 2021

(65) Prior Publication Data
US 2023/0343156 A1 Oct. 26, 2023

(30) Foreign Application Priority Data
Oct. 8, 2019 (SE) .................................... 1951143-5

(51) Int. Cl.
*G07C 9/00* (2020.01)

(52) U.S. Cl.
CPC .................... *G07C 9/00309* (2013.01); *G07C 2009/00793* (2013.01); *G07C 2209/63* (2013.01)

(58) Field of Classification Search
CPC ........................ G07C 9/00309; G07C 2209/63
See application file for complete search history.

(56) References Cited

U.S. PATENT DOCUMENTS 10,469,987 B1 * 11/2019 Kennedy ................. H04W 8/22
2013/0241694 A1 9/2013 Sharma et al.
(Continued)

FOREIGN PATENT DOCUMENTS

CN 105931326 9/2016
CN 106226731 12/2016
(Continued)

OTHER PUBLICATIONS

"190756CN_230729_1st Office Action with search report", with English translation, (dated Jul. 29, 2023), 23 pages.
(Continued)

*Primary Examiner* — Andrew W Bee
(74) *Attorney, Agent, or Firm* — Schwegman Lundberg & Woessner, P.A.

(57) ABSTRACT

It is provided a method for determining whether a portable key device is located inside or outside a metal door. The method is performed by a credential communication device and comprises the steps of: obtaining a first time-of-flight, ToF, measurement between a first antenna and the portable key device, wherein the first antenna is located on the outside of the metal door; obtaining a second ToF measurement between a second antenna and the portable key device, wherein the second antenna is located on the inside of the metal door; and determining the portable key device to be located on the outside of the metal door when the first ToF measurement is less than the second ToF measurement by an amount which is greater than a threshold value.

11 Claims, 2 Drawing Sheets

(56) References Cited

U.S. PATENT DOCUMENTS

| | | | | |
|---|---|---|---|---|
| 2014/0225713 | A1 | 8/2014 | McIntyre et al. | |
| 2016/0055692 | A1* | 2/2016 | Trani | H04W 4/80 340/5.61 |
| 2018/0081025 | A1 | 3/2018 | Jonsson et al. | |
| 2018/0162321 | A1* | 6/2018 | Spiess | G07C 9/00309 |
| 2018/0213355 | A1 | 7/2018 | Smith et al. | |
| 2018/0234797 | A1 | 8/2018 | Ledvina et al. | |
| 2018/0252794 | A1 | 9/2018 | Hermann | |
| 2018/0292506 | A1* | 10/2018 | Bjorkengren | H04W 4/029 |
| 2019/0292839 | A1* | 9/2019 | Kim | G01S 13/08 |
| 2019/0297454 | A1 | 9/2019 | Smith et al. | |
| 2020/0005566 | A1* | 1/2020 | Jain | G07C 9/28 |
| 2021/0304535 | A1* | 9/2021 | Studerus | G07C 9/00309 |
| 2022/0153229 | A1* | 5/2022 | Brückner | E05B 81/78 |
| 2022/0384949 | A1 | 12/2022 | Pirch | |

FOREIGN PATENT DOCUMENTS

| | | |
|---|---|---|
| CN | 107428313 | 12/2017 |
| DE | 10105191 | 9/2002 |
| DE | 102018102405 | 8/2019 |
| EP | 3072754 | 9/2016 |
| EP | 3073284 | 9/2016 |
| EP | 3349192 | 7/2018 |
| WO | 2005114593 | 12/2005 |
| WO | WO 2016/198640 | 12/2016 |
| WO | 2021069468 | 4/2021 |

OTHER PUBLICATIONS

"Microwave Absorber Board Level Shield," Laird Technologies, 2006, Data Sheet EMI-SPEC-MICRO-ABSORBLS-0706, 2 pages.

"The Basics of Signal Attenuation," CAS DataLoggers, Nov. 14, 2016, 9 pages [retrieved online Sep. 11, 2020 from www.dataloggerinc.com/resource-article/basics-signal-attenuation].

O'Keefe "Finding Location with Time of Arrival and Time Difference of Arrival Techniques," ECE Senior Capstone Project 2017 Tech Notes, 2017, pp. 1-3 [retrieved online Jul. 8, 2021 from sites.tufts.edu/eeseniordesignhandbook/files/2017/05/FireBrick_Okeefe_F1.pdf].

Official Action for Sweden Patent Application No. 1951143-5, dated Sep. 15, 2020, 11 pages .

Official Action for Sweden Patent Application No. 1951143-5, dated Apr. 15, 2021, 4 pages International Search Report and Written Opinion for International (PCT) Patent Application No. PCT/EP2020/078051, dated Dec. 21, 2020, 15 pages.

Written Opinion of the International Preliminary Examining Authority for International (PCT) Patent Application No. PCT/EP2020/078051, dated Jul. 15, 2021, 7 pages.

International Preliminary Report on Patentability for International (PCT) Patent Application No. PCT/EP2020/078051, dated Feb. 3, 2022, 7 pages.

"CN Application No. 202080070399.4 Decision of Rejection mailed Jan. 28, 2024", with English translation, 20 pages.

* cited by examiner

INSIDE OR OUTSIDE A METAL DOOR

CROSS REFERENCE TO RELATED APPLICATIONS

This application is a national stage application under 35 U.S.C. 371 and claims the benefit of PCT Application No. PCT/EP2020/078051 having an international filing date of Oct. 7, 2020, which designated the United States, which PCT application claimed the benefit of Sweden Patent Application No. 1951143-5 filed Oct. 8, 2019, the disclosure of each of which are incorporated herein by reference.

TECHNICAL FIELD

The present disclosure relates to the field of location determination of a portable key device and in particular to determining whether a portable key device is located inside or outside a metal door.

BACKGROUND

Lock devices and key devices are evolving from the traditional pure mechanical locks. These days, there are wireless interfaces for electronic lock devices, e.g. by interacting with a portable key device. For instance, Radio Frequency Identification (RFID) has been used as the wireless interface. When RFID is used, the user needs to present the portable key device very close to a reader of the lock.

In order to provide a more user-friendly solution, wireless interfaces, such as Bluetooth Low Energy, BLE, with greater range are starting to be used. This allows the interaction between the portable key device and the lock device to occur without user interaction, e.g. with a portable key device being located in a pocket or handbag. However, in such a situation, there is a risk that someone on the inside unlocks the lock device by simply walking by the lock device. In order to prevent this from happening, without introducing user interaction to open the lock device, there needs to be a way to block portable key devices on the inside from unlocking the lock device.

One way to achieve this is to determine where the portable key device is located, i.e. inside or outside a barrier. In this way, automatic access control could be disabled for inside devices, preventing inadvertent unlocking.

SUMMARY

One objective is to improve how it is determined when a portable key device is located on the inside or outside of a barrier.

According to a first aspect, it is provided a method for determining whether a portable key device is located inside or outside a metal door. The method is performed by a credential communication device and comprises the steps of: obtaining a first time-of-flight, ToF, measurement between a first antenna and the portable key device, wherein the first antenna is located on the outside of the metal door; obtaining a second ToF measurement between a second antenna and the portable key device, wherein the second antenna is located on the inside of the metal door; and determining the portable key device to be located on the outside of the metal door when the first ToF measurement is less than the second ToF measurement by an amount which is greater than a threshold value.

The threshold may be greater than a ToF corresponding to a physical difference between the first antenna and the second antenna.

The method may further comprise the step of: determining the portable key device to be located on the inside of the metal door when the portable key device is not determined to be on the outside of the metal door.

The ToF measurements may be obtained using ultra-wideband, UWB, technology.

According to a second aspect, it is provided a credential communication device for determining whether a portable key device is located inside or outside a metal door. The credential communication device comprises: a processor; and a memory storing instructions that, when executed by the processor, cause the credential communication device to: obtain a first time-of-flight, ToF, measurement between a first antenna and the portable key device, wherein the first antenna is located on the outside of the metal door; obtain a second ToF measurement between a second antenna and the portable key device, wherein the second antenna is located on the inside of the metal door; and determine the portable key device to be located on the outside of the metal door when the first ToF measurement is less than the second ToF measurement by an amount which is greater than a threshold value.

The threshold may be greater than a ToF corresponding to a physical difference between the first antenna and the second antenna.

The credential communication device may further comprise instructions that, when executed by the processor, cause the credential communication device to determine the portable key device to be located on the inside of the metal door when the portable key device is not determined to be on the outside of the metal door.

The ToF measurements may be obtained using ultra-wideband, UWB, technology.

According to a third aspect, it is provided an access control system comprising: the credential communication device according to the second aspect; and a metal door, wherein the metal door is provided between the first antenna and the second antenna of the access communication device.

The metal door may be configured to be connected to ground.

According to a fourth aspect, it is provided a computer program for determining whether a portable key device is located inside or outside a metal door. The computer program comprises computer program code which, when run on a credential communication device causes the credential communication device to: obtain a first time-of-flight, ToF, measurement between a first antenna and the portable key device, wherein the first antenna is located on the outside of the metal door; obtain a second ToF measurement between a second antenna and the portable key device, wherein the second antenna is located on the inside of the metal door; and determine the portable key device to be located on the outside of the metal door when the first ToF measurement is less than the second ToF measurement by an amount which is greater than a threshold value.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
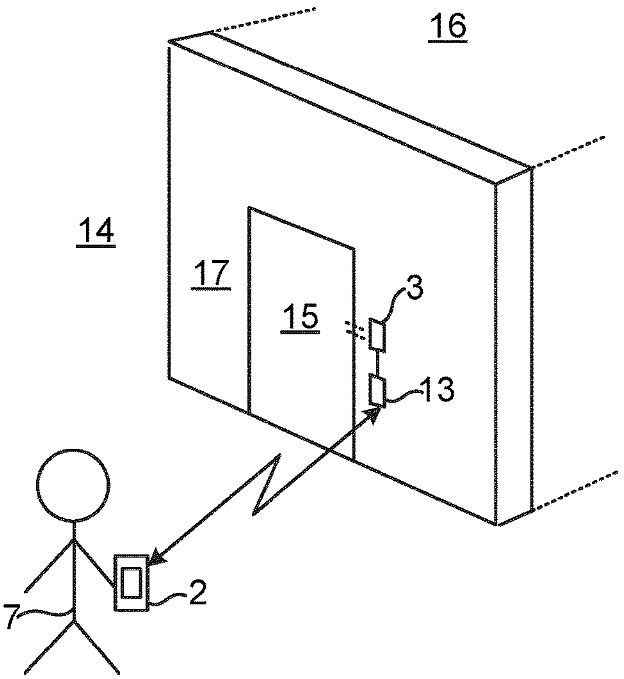
FIG. 1 is a schematic diagram showing an environment in which embodiments presented herein can be applied.

FIG. 1 is a schematic diagram showing an environment in which embodiments presented herein can be applied.

Access to a physical space 16 is restricted by an openable barrier 15 which is selectively unlockable. In this case, the openable barrier is in the form of a metal door. In order to unlock the barrier 15, a credential communication device 13 is provided. The credential communication device 13 is connected to a physical lock device 3, which is controllable by the credential communication device 13 to be set in an unlocked state or locked state. In this embodiment, the credential communication device 13 is mounted close to the physical lock device 3.

Figure 2A:
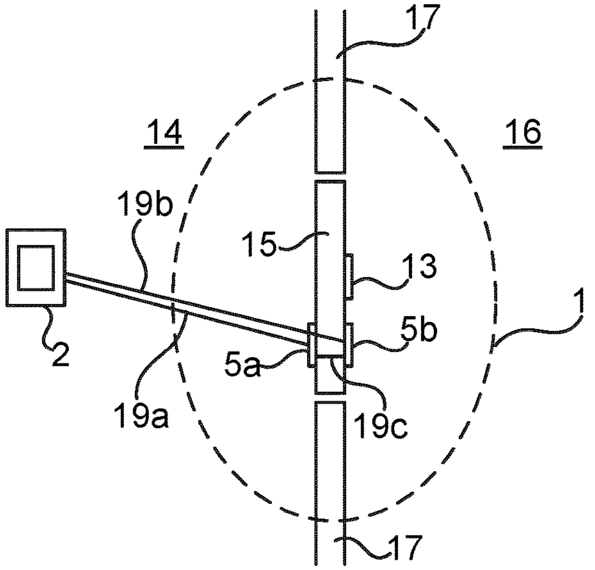
FIGS. 2A-B are schematic top views of the environment of FIG. 1, where also antennas are visible according to two embodiments.
Figure 2B:
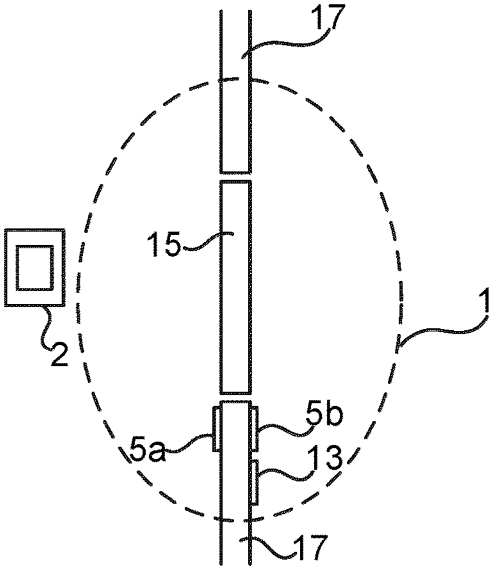

The credential communication device 13 communicates with a portable key device 2 over a wireless interface using a plurality of antennas (shown in FIGS. 2A-B). The portable key device 2 is any suitable device portable by a user and which can be used for authentication over the wireless interface. The portable key device 2 is typically carried or worn by the user and may be implemented as a mobile phone, a smartphone, a key fob, wearable device, smart phone case, RFID (Radio Frequency Identification) card, etc. Using wireless communication, the authenticity and authority of the portable key device can be checked in an unlock procedure, e.g. using a challenge and response scheme, after which the credential communication device 13 grants or denies access. As described in more detail below, the antennas are also used to determine when the portable key device 2 is on the inside 16 or outside of the metal door 15, based on Time-of-Flight (ToF) measurements.

Providing multiple antennas provides additional benefits. For instance, the antennas can be used for beam forming, multiple input/multiple output (MIMO) transmissions, redundancy between antennas, differential antennas, etc.

When access is granted, the credential communication device 13 sends an unlock signal to the lock device 3, whereby the lock device 3 is set in an unlocked state. In this embodiment, this can e.g. imply a signal over a wire-based communication, e.g. using a serial interface (e.g. RS485, RS232), Universal Serial Bus (USB), Ethernet, or even a simple electric connection (e.g. to the lock device 3), or alternatively a wireless interface. When the lock device 3 is in an unlocked state, the metal door 15 can be opened and when the lock device 3 is in a locked state, the metal door 15 cannot be opened. In this way, access to a closed space 16 is controlled by the credential communication device 13. It is to be noted that the credential communication device 13 and/or the lock device 3 can be mounted in a fixed structure (e.g. wall, frame, etc.) by the metal door 15 (as shown) or in the metal door 15 (not shown).

FIGS. 2A-B are schematic top views of the environment of FIG. 1, where also antennas are visible according to two embodiments. Specifically, there is a first antenna 5*a* on the outside 14 of the metal door 15 and a second antenna 5*b* on the inside 16 of the metal door 15. The antennas 5*a-b* are connected to the credential communication device 13.

First, the embodiment of FIG. 2A will be described. Here, the two antennas 5*a*, 5*b* are provided attached to the metal door 15, on either side.

When a portable key device 2 is in the vicinity, the credential communication device 13 will determine whether the device is on the inside or outside of the metal door. This determination is based on Time-of-Flight (ToF). ToF, known in the art per se, uses timing of radio signals to determine distance between two devices. One technology where ToF is used for positioning is Ultra-Wideband (UWB), which can be employed in embodiments presented herein. In ToF, it is determined the time a signal takes to travel between two points. This time is converted to distance using the speed of light.

In this way, a first distance 19*a* being the distance between the first antenna 5*a* and the portable key device 2 can be determined using ToF. Additionally, a second distance 19*b* can be determined using ToF.

The components between the antennas 5*a-b* comprises an RF barrier that delays, fades, blocks or otherwise negatively affects radio signals. The RF barrier is in the form of a metal section of the metal door. In other words, since, the barrier 15 is a metal door, the metal section is integral to the barrier. The presence of metal skews ToF measurements and makes measurements such as angle-of-arrival practically impossible since these depend on very exact time difference measurements. Hence, in the prior art, metal materials are avoided as much as possible when positioning using ToF. Optionally, the RF barrier also comprises RF absorbing material other than metal.

In contrast to the prior art, in the embodiments presented herein, the presence of the metal in the metal door is instead used to improve positioning. Specifically, the time to transfer signals between the portable key device 2 and the second antenna 5*b* is increased in the scenario of FIG. 2A, e.g. due to the radio signal having to take a different path, such as via the openings between the metal door 15 and the surrounding structure 17. In this way, the determined distance based on ToF between the second antenna 5*b* and the portable key device 2 is greater than the actual distance, the second distance 19*b*. This is exploited to determine which side (inside 16 or outside 14) of the metal door 15 that the portable key device 2 is located.

When a ToF measurement between the first antenna 5*a* (on the outside) and the portable key device 2 is less than a ToF measurement between the second antenna 5*b* (on the inside) and the portable key device 2 by an amount which is greater than a ToF corresponding to a physical distance 19*c* between the antennas 5*a-b*, the portable key device 2 is determined to be on the outside. In other words, the ToF measurement from the first antenna 5*a* needs to be less than the ToF measurement from the second antenna 5*b*. Moreover, the difference between the ToF measurements needs to be greater than a threshold value. In one embodiment, the threshold value is greater than a ToF corresponding to the actual distance 19*c* between the two antennas 5*a*, 5*b*. This is the case if the portable key device indeed is on the outside, since the RF barrier in the metal door 15 increases the time for the radio signals to travel between the second antenna 5*b* and the portable key device. Hence, the RF barrier in the metal door 15 increases the difference between the ToF measurements from the two antennas 5*a-b*, which thus provides a more reliable determination of when the portable key device 2 is on the outside 14. The threshold value can be increased depending on the ToF delay resulting from the RF barrier. The greater the threshold value, the less the risk is to incorrectly determine the portable key device to be on the outside. In other words, a more effective RF barrier generating a greater ToF delay allows a greater threshold value to be determined, which increases accuracy in determination of inside and, in particular, outside, of the portable key device 2.

Improving determination of when the portable key device 2 is on the outside improves security, since a false outside determination can result in inadvertent unlocking, e.g. if a person walks by the metal door 15 on the inside 16. In this case, an unauthorised person is able to pass through to the inside 16 through the unlocked metal door 15.

Optionally, the metal door is grounded to increase the negative effect on radio signals and thus to increase the difference in the ToF measurements.

Optionally, radiation-absorbent material is provided on a side of the second antenna 5*b* which does not face the metal door, i.e. towards the inside space. This also increases the difference and quality of the ToF measurements.

The credential communication device 13, the antennas 5*a-b* and the barrier 15 are here collectively called an access control system 1.

In FIG. 2B, an embodiment is shown which is similar to that of FIG. 2A, but where the antennas 5*a-b* are mounted on either side of the surrounding structure 17 and either side of the metal door 15. Again, there is material between the two antennas 5*a-b* which has negative effect on radio signals, exploited in analogy to the description above. The surrounding structure 17 can e.g. comprise concrete.

In FIGS. 2A-B, two antennas 5*a-b* can be seen. However, there may be more antennas provided as desired as long as there is at least one antenna provided on either side of the metal door 15.

Figure 3:
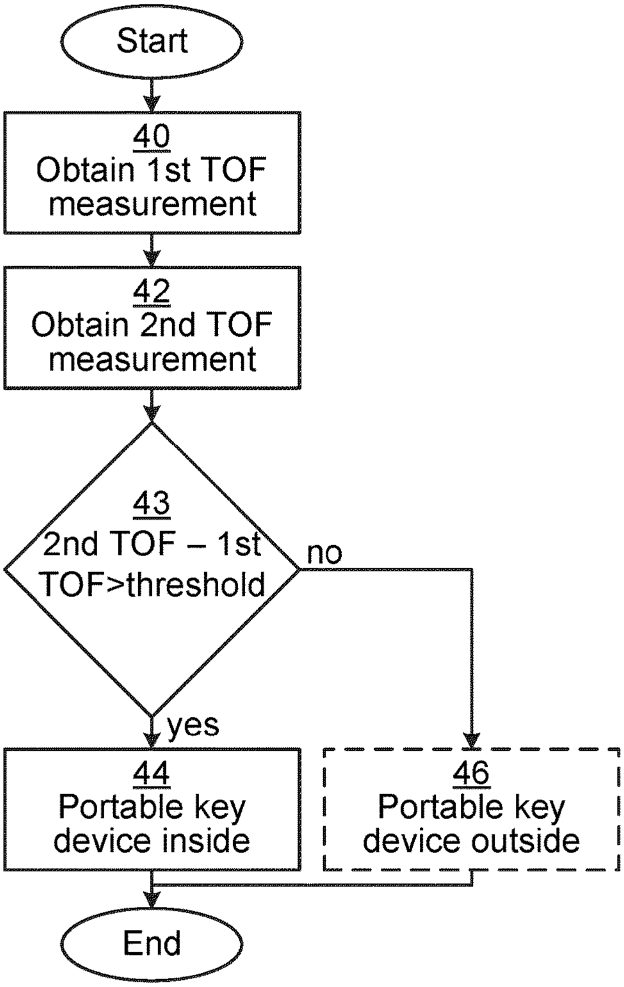
FIG. 3 is a flow chart illustrating embodiments of methods for determining whether a portable key device is located inside or outside a metal door.

FIG. 3 is a flow chart illustrating embodiments of methods for determining whether a portable key device is located inside or outside a metal. The methods are performed in the credential communication device.

In an obtain $1^{st}$ ToF measurement step 40, the credential communication device obtains a first ToF measurement between a first antenna and the portable key device. The first antenna is located on the outside of the metal door.

In an obtain $2^{nd}$ ToF measurement step 42, the credential communication device obtains a second ToF measurement between a second antenna and the portable key device. The second antenna is located on the inside of the metal door.

As explained above, both ToF measurements can be obtained using UWB technology.

In a conditional $2^{nd}$ ToF−$1^{st}$ ToF>threshold step 43, the credential communication device determines when a condition is true that the first ToF measurement is less than the second ToF measurement by an amount which is greater than a threshold amount. The threshold amount is a ToF value corresponding to a physical distance between the first antenna and the second antenna. The ToF measurements can be expressed as times or distances, as long as the comparison is made using the same physical quantity. If this condition is true, the method proceeds to a portable key device inside step 44. Otherwise, the method optionally proceeds to an optional portable key device outside step 46 or the method ends.

In the portable key device inside step 44, the credential communication device determines the portable key device to be located on the outside of the metal door.

In the optional portable key device outside step 46, the credential communication device determines the portable key device to be located on the inside of the metal door when the portable key device is not determined to be on the outside of the metal door.

Figure 4:
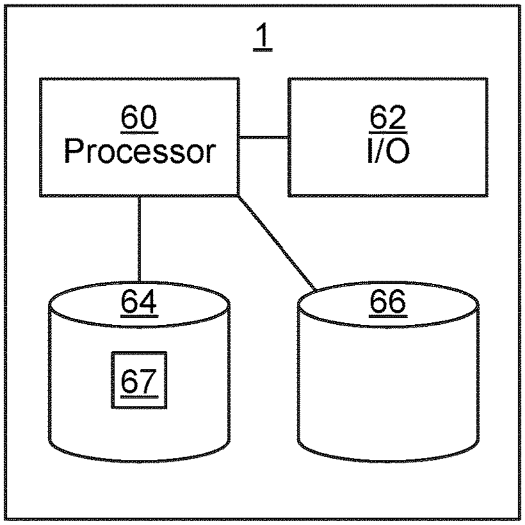
FIG. 4 is a schematic diagram illustrating components of the credential communication device of FIGS. 1 and 2.

FIG. 4 is a schematic diagram illustrating components of the credential communication device 13 of FIGS. 1 and 2. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The credential communication device 13 further comprises an I/O interface 62 for communicating with external and/or internal entities. Optionally, the I/O interface 62 also includes a user interface.

Other components of the credential communication device 13 are omitted in order not to obscure the concepts presented herein.

Figure 5:
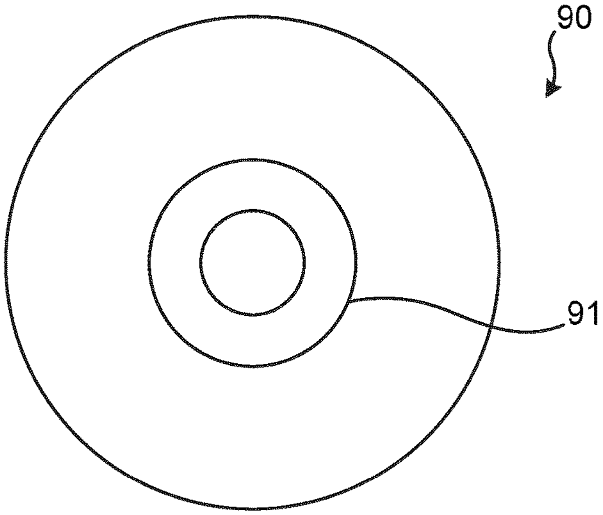
FIG. 5 shows one example of a computer program product 90 comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a list of embodiments from another perspective, enumerated with roman numerals.

i. A method for determining whether a portable key device is located inside or outside an openable barrier comprising an RF, radio frequency, barrier, the method being performed by a credential communication device and comprising the steps of:

obtaining a first time-of-flight, ToF, measurement between a first antenna and the portable key device, wherein the first antenna is located on the outside of the barrier;

obtaining a second ToF measurement between a second antenna and the portable key device, wherein the second antenna is located on the inside of the barrier; and determining the portable key device to be located on the outside of the barrier when the first ToF measurement is less than the second ToF measurement by an amount which is greater than a threshold value.

ii. The method according to embodiment i, wherein the threshold is greater than a ToF corresponding to a physical difference between the first antenna and the second antenna.

iii. The method according to embodiment i or ii, further comprising the step of:

determining the portable key device to be located on the inside of the barrier when the portable key device is not determined to be on the outside of the barrier.

iv. The method according to any one of the preceding embodiments, wherein the ToF measurements are obtained using ultra-wideband, UWB, technology.

v. The method according to any one of the preceding embodiments, wherein the RF barrier comprises metal.

vi. The method according to any one of the preceding embodiments, wherein the RF barrier comprises RF absorbing material vii. The method according to any one of the preceding embodiments, wherein the RF barrier forms part of the openable barrier.

viii. A credential communication device for determining whether a portable key device is located inside or outside an openable barrier comprising an RF, radio frequency, barrier, the credential communication device comprising:

a processor; and a memory storing instructions that, when executed by the processor, cause the credential communication device to:

obtain a first time-of-flight, ToF, measurement between a first antenna and the portable key device, wherein the first antenna is located on the outside of the barrier;

obtain a second ToF measurement between a second antenna and the portable key device, wherein the second antenna is located on the inside of the barrier; and determine the portable key device to be located on the outside of the barrier when the first ToF measurement is less than the second ToF measurement by an amount which is greater than a threshold value.

ix. The credential communication device according to embodiment viii, wherein the threshold is greater than a ToF corresponding to a physical difference between the first antenna and the second antenna.

x. The credential communication device according to embodiment viii or ix, further comprising instructions that, when executed by the processor, cause the credential communication device to determine the portable key device to be located on the inside of the barrier when the portable key device is not determined to be on the outside of the barrier.

xi. The credential communication device according to any one of embodiments viii to x, wherein the ToF measurements are obtained using ultra-wideband, UWB, technology.

xii. The credential communication device according to any one of embodiments viii to xi, wherein the RF barrier comprises metal.

xiii. The credential communication device according to any one of embodiments viii to xii, wherein the RF barrier comprises RF absorbing material.

xiv. The credential communication device according to any one of embodiments viii to xiii, wherein the RF barrier forms part of the openable barrier, in the form of a metal door.

xv. An access control system comprising:

the credential communication device according to any one of the embodiments viii to xiv; and an openable barrier, wherein the barrier comprises an RF barrier provided between the first antenna and the second antenna of the access communication device.

xvi. The access control system according to embodiment xv, wherein the RF barrier comprises a metal section being configured to be connected to ground.

xvii. The access control system according to embodiment xv or xvi, wherein the barrier is a metal door, whereby the RF barrier is integral to the barrier.

xviii. A computer program for determining whether a portable key device is located inside or outside an openable barrier comprising an RF, radio frequency, barrier, the computer program comprising computer program code which, when run on a credential communication device causes the credential communication device to:

obtain a first time-of-flight, ToF, measurement between a first antenna and the portable key device, wherein the first antenna is located on the outside of the barrier;

obtain a second ToF measurement between a second antenna and the portable key device, wherein the second antenna is located on the inside of the barrier; and determine the portable key device to be located on the outside of the barrier when the first ToF measurement is less than the second ToF measurement by an amount which is greater than a threshold value.

xix. A computer program product comprising a computer program according to embodiment xviii and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for determining whether a portable key device is located inside or outside a metal door, the method being performed by a credential communication device and comprising:

obtaining a first time-of-flight, ToF, measurement between a first antenna and the portable key device, wherein the first antenna is located on the outside of the metal door;

obtaining a second ToF measurement between a second antenna and the portable key device, wherein the second antenna is located on the inside of the metal door; and determining the portable key device to be located on the outside of the metal door when the first ToF measurement is less than the second ToF measurement by an amount which is greater than a threshold value.

2. The method according to claim 1, wherein the threshold is greater than a ToF corresponding to a physical difference between the first antenna and the second antenna.

3. The method according to claim 1, further comprising:

determining the portable key device to be located on the inside of the metal door when the portable key device is not determined to be on the outside of the metal door.

4. The method according to claim 1, wherein the ToF measurements are obtained using ultra-wideband, UWB, technology.

5. A credential communication device for determining whether a portable key device is located inside or outside a metal door, the credential communication device comprising:

a processor; and a memory storing instructions that, when executed by the processor, cause the credential communication device to:

obtain a first time-of-flight, ToF, measurement between a first antenna and the portable key device, wherein the first antenna is located on the outside of the metal door;

obtain a second ToF measurement between a second antenna and the portable key device, wherein the second antenna is located on the inside of the metal door; and determine the portable key device to be located on the outside of the metal door when the first ToF measurement is less than the second ToF measurement by an amount which is greater than a threshold value.

6. The credential communication device according to claim 5, wherein the threshold is greater than a ToF corresponding to a physical difference between the first antenna and the second antenna.

7. The credential communication device according to claim 5, further comprising instructions that, when executed by the processor, cause the credential communication device to determine the portable key device to be located on the inside of the metal door when the portable key device is not determined to be on the outside of the metal door.

8. The credential communication device according to claim 5, wherein the ToF measurements are obtained using ultra-wideband, UWB, technology.

9. An access control system comprising:

the credential communication device according to claim 5; and a metal door, wherein the metal door is provided between the first antenna and the second antenna of the access communication device.

10. The access control system according to claim 9, wherein the metal door is configured to be connected to ground.

11. A non-transitory computer readable medium storing a computer program for determining whether a portable key device is located inside or outside a metal door, the computer program comprising computer program code which, when run on a credential communication device, causes the credential communication device to:

obtain a first time-of-flight, ToF, measurement between a first antenna and the portable key device, wherein the first antenna is located on the outside of the metal door;

obtain a second ToF measurement between a second antenna and the portable key device, wherein the second antenna is located on the inside of the metal door; and determine the portable key device to be located on the outside of the metal door when the first ToF measurement is less than the second ToF measurement by an amount which is greater than a threshold value.

* * * * *